(No Model.)

J. A. HOSKINS.
POTATO PLANTING ATTACHMENT FOR CORN PLANTERS.

No. 290,233. Patented Dec. 18, 1883.

WITNESSES
S. J. Nottingham
Geo. F. Downing

INVENTOR
J. A. Hoskins.
By H. A. Seymour.
Attorney

United States Patent Office.

JOSHUA ALFRED HOSKINS, OF JANESVILLE, WISCONSIN.

POTATO-PLANTING ATTACHMENT FOR CORN-PLANTERS.

SPECIFICATION forming part of Letters Patent No. 290,233, dated December 18, 1883.

Application filed August 18, 1883. (No model.)

*To all whom it may concern:*

Be it known that I, JOSHUA ALFRED HOSKINS, of Janesville, in the county of Rock and State of Wisconsin, have invented certain new and useful Improvements in Potato-Planting Attachments for Corn-Planters; and I do hereby declare the following to be a full, clear, and exact description of the invention, such as will enable others skilled in the art to which it appertains to make and use the same.

My invention relates to an improvement in potato-planters, the object of the same being to provide a device of this character which may be adjusted to any kind of horse corn-planters. A further object is to provide a machine of this charater which shall be simple and economical in construction and durable and efficient in use.

With these objects in view, my invention consists in certain details of construction and combinations of parts, as will be hereinafter more particularly described, and pointed out in the claims.

Figure 1:
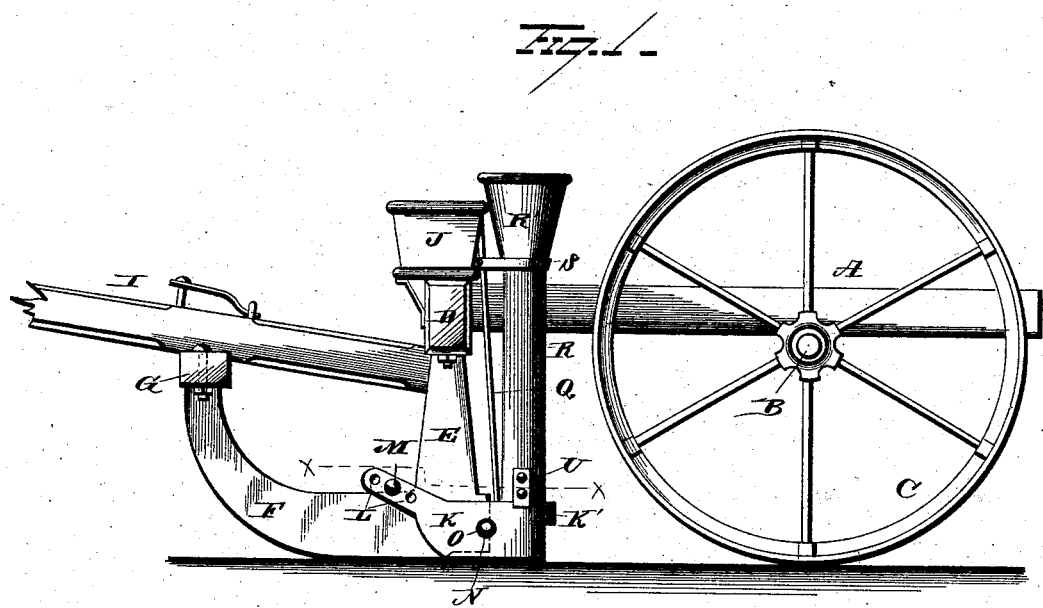
Figure 2:
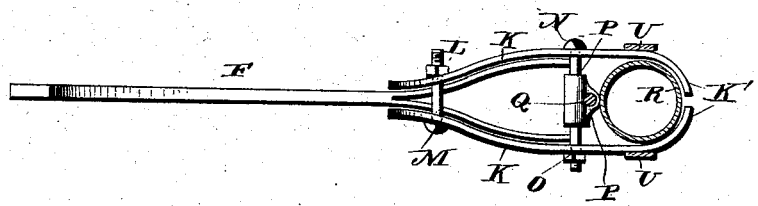

In the accompanying drawings, Figure 1 is a side elevation of my improvement. Fig. 2 is a view of the same on line *x x*.

A represents the frame of a corn-planting machine of any desired construction, and attached thereto is the axle B, to which are secured the wheels C. D is a cross-bar, to which is attached the frame-piece A, fastened by any suitable means. E is a depending leg, to which is fastened the shoe F. The shoe is adapted to rest upon the ground with its forward end curved and fastened to the cross-bar G. The said bar is held in position by suitable braces. Over the bar D is the pole I, fastened to the frame by any suitable means. The corn-hopper J is of any desired construction, and fastened by suitable means to the cross-bar D.

K is a cutter-plate, preferably made of steel, having its front edges sharpened and its outer faces beveled. It is provided with two or more bolt-holes, L, adapted to receive the bolt M, thus permitting the cutter to be raised and lowered as desired. The bolt N, which passes through the bolt-hole O behind the shoe, is provided with a sleeve, P, having a perforated lug, P', through which the brace Q passes, and is secured therein in any suitable manner. The rear ends of the plates are provided with curved arms K', adapted to encircle and form a bearing for the tube R. The said tube is made of any suitable material and provided with a funnel-shaped hopper, R', into which the potatoes are introduced. The tube R is attached to the corn-hopper J by means of the strap S. Q is a brace, made preferably of iron, the upper end being attached in any suitable way to the corn-hopper J, while its lower end passes through the perforation in the lug P' and is secured therein, thus holding the cutter-plate in a fixed position. On each side of the tube R and the cutter-plate K are braces U, fastened in any suitable manner, their object being to hold the tube R and the cutter-plate K together.

My device is simple in construction, is efficient and durable in use, and can be made at a small initial cost.

It is evident that slight changes in the construction and relative arrangement of the several parts of my improvement might be resorted to without departing from the spirit of my invention; and hence I would have it understood that I do not confine myself to the exact construction shown and described, but consider myself at liberty to make such changes and alterations as fairly fall within the spirit and scope of my invention.

Having thus fully described my invention, what I claim as new, and desire to secure by Letters Patent, is—

1. The combination, with the shoe of a seed-planter, of a potato-planting attachment consisting of the plates K, adjustably secured to the shoe, and the tube R, the lower end of which is supported within the curved rear ends of said plates, substantially as set forth.

2. The combination, with the shoe F and plates K, adjustably secured to the shoe, of the tube R, provided with the straps U, substantially as set forth.

3. The combination, with the shoe F, plates K, and tube R, of the brace Q, bolt O, and sleeve P, substantially as set forth.

In testimony whereof I have signed this specification in the presence of two subscribing witnesses.

JOSHUA ALFRED HOSKINS.

Witnesses:
T. VAN VALEN,
P. G. STRICKLER.